(12) United States Patent
Kocher et al.

(10) Patent No.: US 9,444,623 B2
(45) Date of Patent: Sep. 13, 2016

(54) MODULAR EXPONENTIATION OPTIMIZATION FOR CRYPTOGRAPHIC SYSTEMS

(71) Applicant: CRYPTOGRAPHY RESEARCH, INC., San Francisco, CA (US)

(72) Inventors: Paul C. Kocher, San Francisco, CA (US); Michael A. Hamburg, San Francisco, CA (US); Ambuj Kumar, Sunnyvale, CA (US)

(73) Assignee: CRYPTOGRAPHY RESEARCH, INC., San Francisco, CA (US)

( * ) Notice: Subject to any disclaimer, the term of this patent is extended or adjusted under 35 U.S.C. 154(b) by 95 days.

(21) Appl. No.: 14/567,954

(22) Filed: Dec. 11, 2014

(65) Prior Publication Data

US 2015/0180652 A1    Jun. 25, 2015

Related U.S. Application Data

(60) Provisional application No. 61/919,610, filed on Dec. 20, 2013.

(51) Int. Cl.
*H04L 9/30*    (2006.01)

(52) U.S. Cl.
CPC ........... *H04L 9/302* (2013.01); *H04L 2209/12* (2013.01)

(58) Field of Classification Search
CPC .......................... H04L 2209/12; H04L 9/302
USPC ........................................... 380/22; 713/189
See application file for complete search history.

(56) References Cited

U.S. PATENT DOCUMENTS

| | | | |
|---|---|---|---|
| 2005/0084098 A1* | 4/2005 | Brickell | G06F 7/723 380/28 |
| 2007/0064930 A1* | 3/2007 | Fischer | G06F 7/723 380/28 |
| 2014/0281573 A1* | 9/2014 | Jaffe | G06F 21/72 713/189 |

OTHER PUBLICATIONS

Thomas S. Messerges, Ezzy A. Dabbish and Robert H. Sloan "Power Analysis Attacks of Modular Exponentiation in Smartcards", Cryptographic Hardware and Embedded Systems (CHES'99), Springer-Verlag, pp. 144-157.*

* cited by examiner

*Primary Examiner* — Amare F Tabor
*Assistant Examiner* — Abiy Getachew
(74) *Attorney, Agent, or Firm* — Lowenstein Sandler LLP

(57) ABSTRACT

A processing device, such as logic on an integrated circuit may identify a cryptographic message stored in a first register. The processing device may determine a plurality of components for a second power of the cryptographic message using a plurality of components of the cryptographic message. The processing device may determine the plurality of components for the second power of the cryptographic message without storing the entire second power of the cryptographic message. Further, the processing device may determine a third power of the cryptographic message using modular arithmetic. The processing device may determine the third power by transforming the plurality of components for the second power of the cryptographic message and the plurality of components of the cryptographic message.

14 Claims, 4 Drawing Sheets

MODULAR EXPONENTIATION OPTIMIZATION FOR CRYPTOGRAPHIC SYSTEMS

CROSS-REFERENCE TO RELATED APPLICATIONS

This application claims priority to U.S. Provisional App. No. 61/919,610, filed Dec. 20, 2013, which is hereby incorporated by reference in its entirety.

TECHNICAL FIELD

The present disclosure relates to cryptographic systems and, more particularly, to modular exponentiation optimization for cryptographic systems.

BACKGROUND

Generally, cryptosystem implementations include a combination of hardware and software. For example, cryptographic smartcards typically include a hardware microprocessor that executes programs stored in internal secure memory (which can be read-only or updateable). The internal secure memory or other memory is typically used to hold cryptographic keys, which are managed by these programs. Such keys are used in connection with various cryptographic operations including, without limitation, symmetric encryption using DES (Data Encryption Standard), triple DES, IDEA (International Data Encryption Algorithm), SEAL (Software-Optimized Encryption Algorithm), and RC4; public key (asymmetric) encryption and decryption using, RSA and ElGamal; digital signatures using, DSA (Digital Signature Algorithm), ElGamal, and RSA; and Diffie-Hellman key agreement protocols. The key-based operations are, in turn, used to securely process messages being handled by the cryptosystems.

In asymmetric (i.e., public-key based) systems, private keys can be used to create digital signatures and decrypt received data. In the RSA protocol, a sender of a message can use a private key to sign the message, and a recipient of the message can use a public key to verify the origin of the message. In the RSA protocol, a private key may include a modulus (N) for performing modular arithmetic and a secret exponent (d). In mathematics, modular arithmetic (sometimes referred to as "clock arithmetic") is a system of arithmetic for integers, where numbers "wrap around" upon reaching a certain value (i.e., the modulus).

The private key has a corresponding public key that includes the modulus (N) and a public exponent (y). For example, Alice may have a private key (N, d) and a public key (N, y) and she may wish to send a message to Bob. Alice's private key (N, d) can be used to send the message to Bob. For example, a hash value of the message can be produced, and the hash value of the message can be raised to the power of d (modulo N) and attached as a signature to the message. When Bob receives the signed message, the same hash algorithm can be used in conjunction with Alice's public key to verify whether the message was sent by Alice. Alice's public key (N, y) can be used to process the signed message. The signature can be raised to the power of y (modulo N), and the resulting hash value can be compared with the message's actual hash value. If the two hash values match, it is determined that the author of the message was in possession of Alice's private key, and that the message has not been tampered with since.

In another example, an authorized entity may generate a cryptographic message (e.g., command) and sign the cryptographic message using a private key (e.g., private key (N, d)), and the hardware in the cryptographic system may use a public key (e.g., public key (N, y)), which corresponds to the private key, to verify that the cryptographic message was generated using the matching private key. As part of the verification, the hardware in the cryptographic system may use a modulus (N), the public exponent (y), and the cryptographic message (cm). The cryptographic system may compute $cm^y$ (mod N). The base cm is the message (or, more generically, some quantity derived therefrom or representation thereof). In cases where y=3, traditional cryptographic systems may use three registers of the same size to determine $cm^3$ (mod N). For example, conventional solutions may include a 2048-bit register to store the cryptographic message cm, a 2048-bit register to store $cm^2$ (mod N), and a 2048-bit register to store $cm^3$ (mod N). Traditional solutions generally first compute $cm^2$ (mod N) using modular arithmetic and also use $cm^2$ (mod N) to compute $cm^3$ (mod N), which generally results in significant hardware usage and extensive processing resources (e.g. if registers holding intermediate values are comprised of data in flip flops, register files, SRAM, or other internal storage within a chip performing the calculation).

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
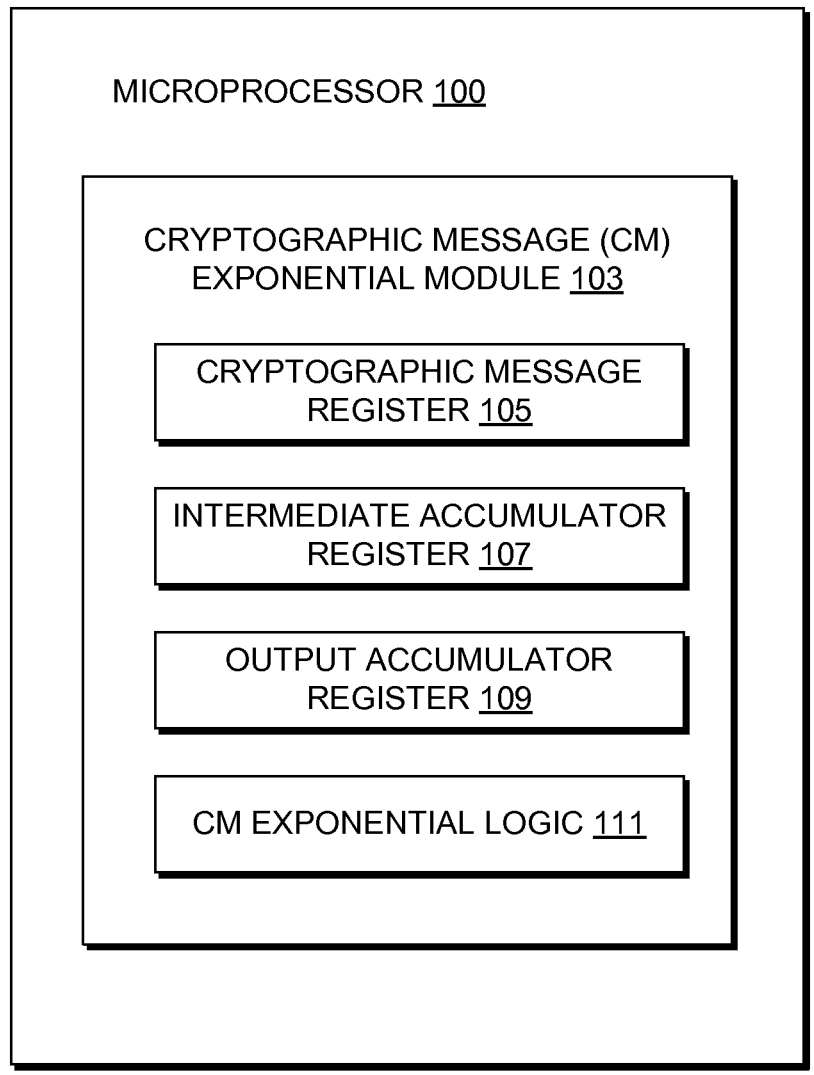
FIG. 1 illustrates a block diagram of a microprocessor including a cryptographic message (CM) exponential module for determining a y−1 power of a cryptographic message without using modulo arithmetic and using the y−1 power of the cryptographic message to determine cm^y (mod N), according to one implementation.

A system and method for determining a squared output of a cryptographic message (cm) without using modular arithmetic and for using the squared output to determine a cubed output of the cryptographic message modulo N is described, according to various implementations. Many cryptographic operations involve asymmetric cryptographic protocols (e.g., RSA or Diffie-Hellman) that use modular exponentiation including a private key having a modulus (N) and a secret exponent (d). The private key (N, d) has a corresponding public key, which includes the modulus (N) and a public exponent (y). The private key (N, d) can be used to sign a message. For example, an authorized entity may generate a cryptographic message (e.g., command) and sign the cryptographic message using a private key (N, d). The hardware in a cryptographic system may use the public exponent (y) from the public key (N, y) to verify that the cryptographic message was generated by the authorized entity using the matching private key. As part of the verification, the hardware in the cryptographic system may use a modulus (N), the public exponent (y), and the cryptographic message (cm). The cryptographic system may compute $cm^y$ (mod N). An example of a public exponent y, where y=3, is used throughout this document for illustration and should not limit implementations of the present disclosure in any way.

The operations for verifying that the cryptographic message was generated by the authorized entity using the appropriate private key may include determining a result (R) as $R=x^y$ (mod N), where "^" denotes exponentiation (e.g., $2^5=32$). The base x is the message (or, more generically, some quantity derived therefrom or representation thereof), y is the public exponent (of z bits in length), and N is the (prime or composite) modulus. The base (e.g., message x) is hereinafter referred to as a cryptographic message or "cm" or "CM". Cryptographic messages can be, for example, and are not limited to, signatures, keys, hashes, or other values. In one implementation, the modulus N is part of a public key (e.g., for the RSA cryptosystem).

Implementations of the present disclosure can compute $cm^y$ (mod N) without having to first compute $cm^{(y-1)}$ (mod N). For example, implementations of the present disclosure compute $cm^2$ without using modular arithmetic and then use the $cm^2$ to compute $cm^3$ (mod N). Unlike traditional solutions, which generally first compute $cm^2$ (mod N), the present disclosure includes implementations that determine $cm^3$ (mod N) without computing $cm^2$ (mod N). For example, a microprocessor, non-processor hardware logic, or other processing hardware may determine multiple components (e.g., words [j]) of the second power of the cryptographic message using the components (e.g., words [k], words [l]) of the cryptographic message without storing an actual second power of the cryptographic message and without using modular arithmetic. A word represents a component of the cryptographic message or a component of the second power of the cryptographic message, and is hereinafter used to describe a fixed-sized subset of the cryptographic message bits that are handled as a unit by an instruction set and/or hardware of a microprocessor and/or other logic. The actual second power of the cryptographic message refers to the value when $cm^{(y-1)}$ is calculated. Whereas, implementations of the present disclosure can compute components (e.g., words) of $cm^{(y-1)}$. The output of $cm^3$ (mod N) can be used, for example, in RSA key exchange, RSA encryption, signatures, etc.

FIG. 1 illustrates a block diagram of a microprocessor 100 including a cryptographic message (CM) exponential module 103 for determining a y−1 power of a cryptographic message without using modulo arithmetic and using the y−1 power of the cryptographic message to determine $cm^y$ (mod N), according to one implementation. The exponent y=3 is used as a non-limiting example. Likewise, implementation involving microprocessors is also a non-limiting example (e.g., the efficiency benefits provided herein can be particularly beneficial for hardware embodiments, such as FPGAs, SoCs and other chips, including those where the cryptographic implementation operates independently from any microprocessors that may be present). The CM exponential module 103 can include a cryptographic message register 105 to store a cryptographic message (or, more generically, some quantity derived therefrom or representation thereof), an intermediate accumulator register 107 to store words for $cm^2$, and an output accumulator register 109 to store $cm^3$ (mod N). The output accumulator register 109 can store words of $cm^3$ modulus N.

The CM exponential module 103 can include two large registers (e.g., cm register 105, output accumulator register 109) and at least one small register (e.g., intermediate accumulator register 107). In one implementation, the size of the cm register 105 and the size of the output accumulator register 109 correspond to the size of the cryptographic message. For example, the size of the cm register 105 and the size of the output accumulator register 109 may be the same size as the cryptographic message. In one implementation, the output accumulator register 109 is a few bits larger than the cm register 105 to handle carries in arithmetic. In one implementation, the cryptographic message and the modulus N are each 2048 bits, and the cm register 105 and the output accumulator register 109 are each 2048-bit registers. In one implementation, the intermediate accumulator register 107 holds slightly more than two words from $cm^2$, which may be an insignificant portion of the total number of words for $cm^2$, and is much smaller than the cm register 105. In one implementation, the intermediate accumulator register 107 is a 70-bit register. The CM exponential module 103 can include CM exponential logic 111 to use the registers (register 105, register 107, register 109) to determine words of $cm^2$ without using modulo arithmetic and can use the words of $cm^2$ to determine $cm^3$ (mod N).

Figure 2:
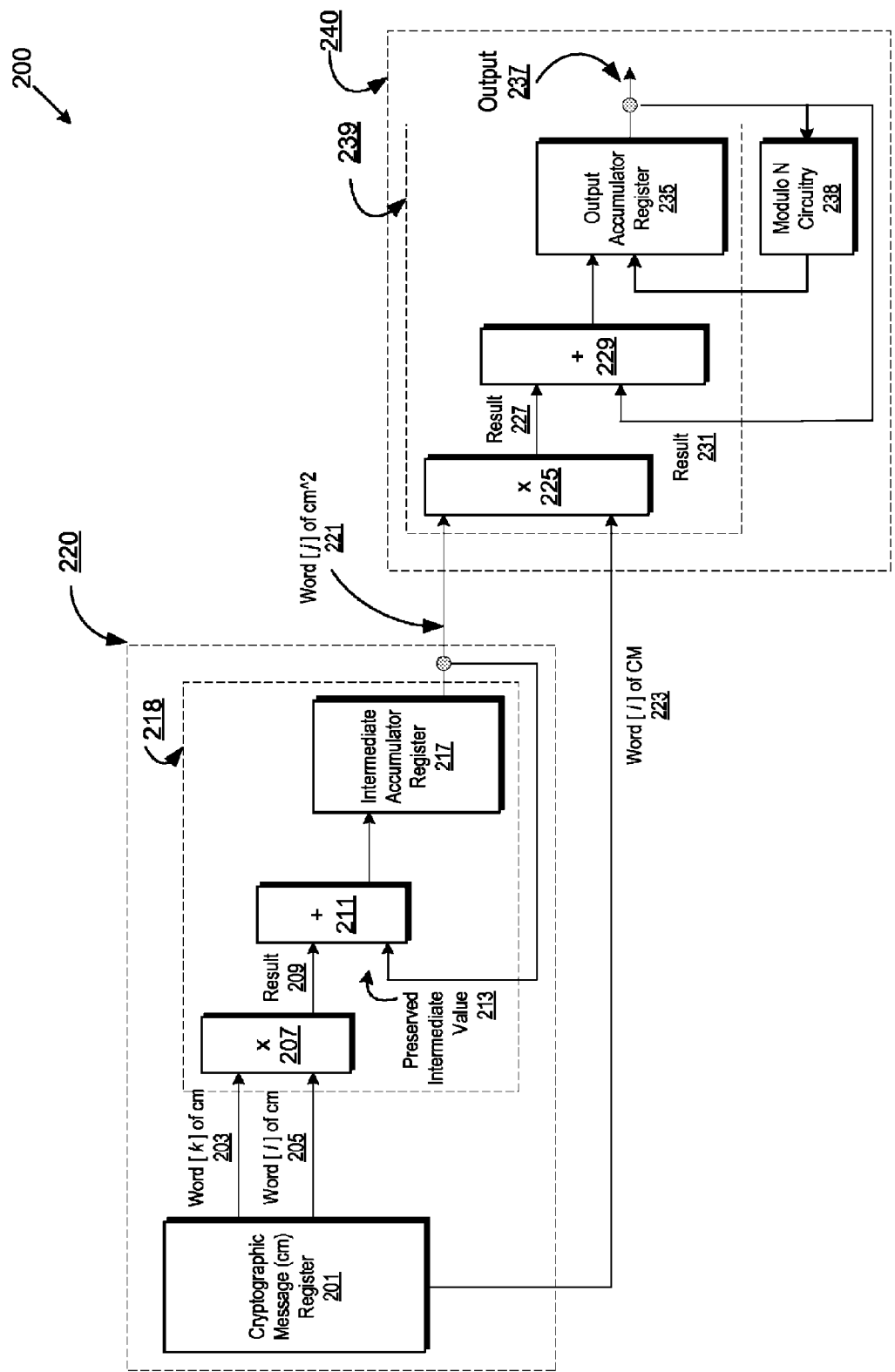
FIG. 2 illustrates a block diagram of a cryptographic message exponential module for determining words of cm^(y−1) without using modulo arithmetic and using the words of cm^(y−1) to determine cm^y (mod N), according to one implementation.

FIG. 2 illustrates a block diagram of a cryptographic message (CM) exponential module 200 for determining words of $cm^{(y-1)}$ without using modulo arithmetic and using the words of $cm^{(y-1)}$ to determine $cm^y$ (mod N), according to one implementation. The exponent y=3 is used as a non-limiting example. The CM exponential module 200 can include a cryptographic message register 201 to store a cryptographic message, an intermediate accumulator register 217 to store words of $cm^2$, and an output accumulator register 235 to store $cm^3$ (mod N).

The CM exponential module 200 can determine an output 237 (e.g., $cm^3$ (mod N)) using two fused outer loops (e.g., loop 220 and loop 240). Loop 220, which can compute words [j] of $cm^2$ with product scanning, and loop 240, which can compute $cm^3$ (mod N) with operand scanning, enable a reduction in the size of the intermediate accumulator register 217. For example, the intermediate accumulator register 217 may be smaller than the output accumulator register 235, which stores the $cm^3$ reduced modulo N. For example, the intermediate accumulator register 217 may be a 70-bit register, and the cryptographic message register 201 and the output accumulator register 235 may be 2048-bit registers.

In loop 220, a word [j] of $cm^2$ (221) can be computed by product scanning on the cryptographic message. Loop 220 can determine the word [i] of $cm^2$ (221) using the words (e.g., word [k] 203, word [l] 205) of the cryptographic message and an intermediate accumulator 218. Word [k] 203 and word [l] 205 can be, for example, digits of the cryptographic message (or some quantity derived therefrom or representation thereof). The intermediate accumulator 218 can include multiplier circuitry 207 ("multiplier"), adder circuitry 211 ("adder"), and an intermediate accumulator register 217 to compute the product of two inputs and add that product to an accumulator (i.e., the contents of the intermediate accumulator register 217). The output of the intermediate accumulator register 217 is fed back as a preserved intermediate value 213 to one input of the adder 211, such that with another iteration of loop 220, the result 209 of the multiplier 207 and the preserved intermediate value 213 together replace the contents in the intermediate accumulator register 217. For example, the intermediate accumulator 218 modifies an accumulator a (i.e., contents of intermediate accumulator register 217) as:

$$a \leftarrow a + (b \times c) \qquad \text{Statement 1}$$

In Statement 1, a is the word [j] of cm^2, b is word [k] of cm (203) and c is word [l] of cm (205). One implementation of determining the word [j] of cm^2 using the word [k] and the word [l] of the cryptographic message is described in greater detail below in conjunction with FIG. 3. In loop 220, k+l=j, and the loop 220 can be iterative, for example, by incrementing k, until k=j.

When k=j, and the intermediate accumulator register 217 stores the actual word [j] of cm^2 (221), for example, in the case of Montgomery reduction, where j increments. For example, where j=3 and in the case of Montgomery reduction, the intermediate accumulator register 217 stores the actual word [3] of cm^2 (221). In another example, in the case of Barrett reduction, where j decrements, the intermediate accumulator register 217 stores an estimate of the actual word.

The output of loop 220 is a word [j] of cm^2 (221) and can be provided as an input to loop 240 for determining cm^3 (mod N). Loop 220 can be iterative. The number of iterations can be based on the number of words [j] in cm^2. For example, the number of words [j] in cm^2 may be 2 log N/log W, where log W is the number of bits in a machine word. The number of words [j] may be more or fewer than 2 log N/log W due to implementation or cryptosystem choices. For example, cm may be longer than N due to message blinding. The loop 220 can determine each word [j] of cm^2 and provide each word [j] of cm^2 to an output accumulator 239 in loop 240.

The output accumulator 239 for cm^3 (mod N) can include multiplier circuitry 225 ("multiplier"), adder circuitry 229 ("adder"), an output accumulator register 235, and modulo N circuitry 238. In loop 240, the output accumulator 239 for outputting cm^3 (mod N) can be updated by an operand scanning operation with the word [l] of cm^2 (221) as the outer operand of the multiplier circuit 225 and a word [i] 223 of the cryptographic message as the inner operand of the multiplier circuit 225. One implementation of determining cm^3 (mod N) is described in greater detail below in conjunction with FIG. 3.

The result 227 is an input into adder circuitry 229 and the other input to the adder circuitry 229 is the result 231, which is written back from the output accumulator register 235 as an input to the adder circuitry 229. The loop 240 can include modulo N circuitry 238 to reduce the contents (e.g., cm^3) of the output accumulator register (235) modulo N. The cm^3 can be reduced modulo N, for example, using coarse or fine reduction, exact or approximate reduction, Montgomery or Barrett reduction, or some other type of reduction. The modulo N circuitry 238 can include for example, and is not limited to, a register, memory, ROM, etc., to store a modulus N. Loop 240 can be iterative. The number of iterations can be based on the number of words [j] in cm^(y−1) (e.g., cm^2). For each word [j], the output accumulator 239 can be updated by an operand scanning operation. The microprocessor (or state machine) can include a loop counter register j and can increment or decrement j based on the number of words [j] in cm^2. It can include a loop counter register k, a loop counter register l, and a loop counter register i, which can be incremented accordingly.

Figure 3:
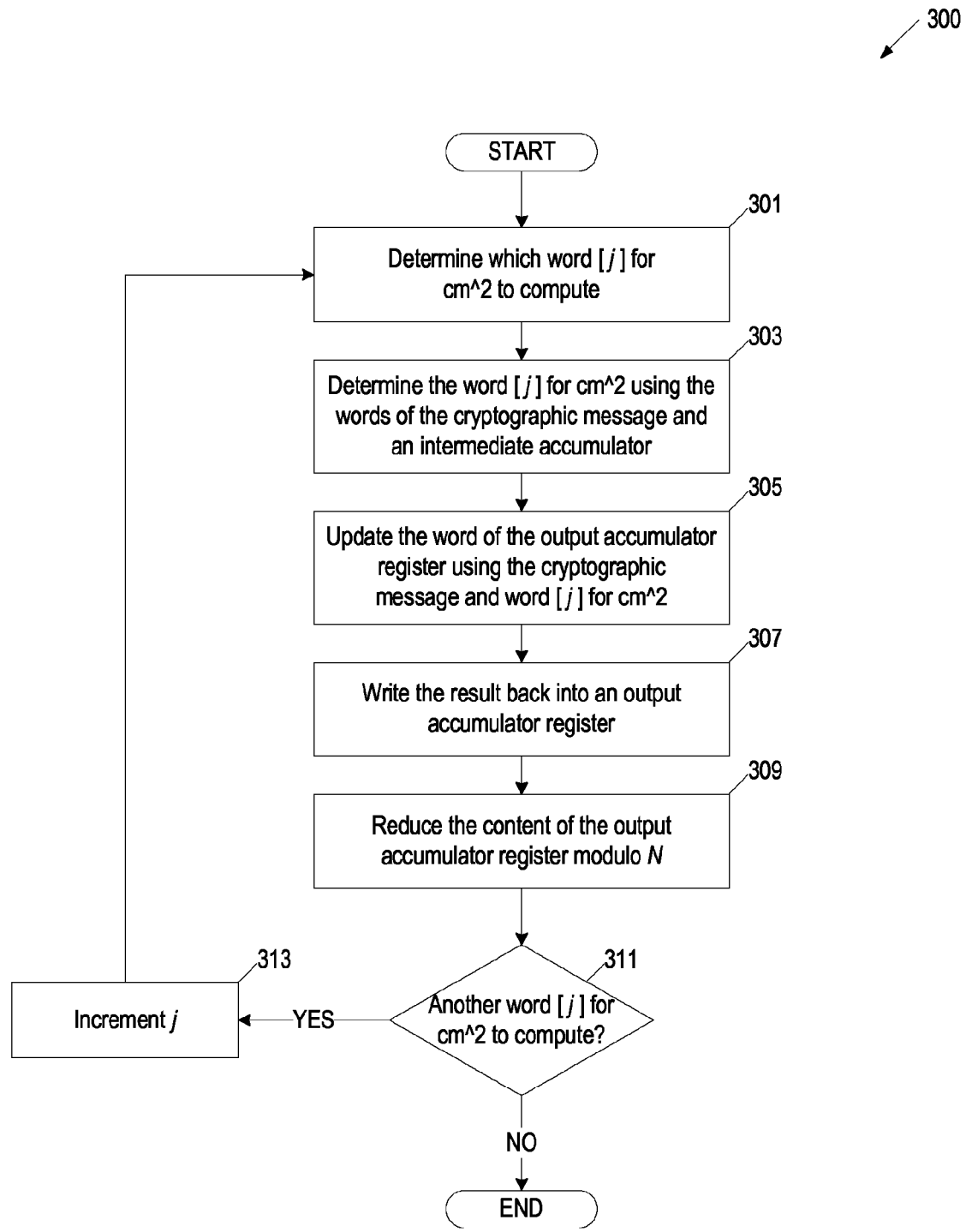
FIG. 3 is a flow diagram of method for determining cm^(y−1) without using modulo arithmetic and using cm^(y−1) to determine cm^y (mod N) according to some embodiments.

FIG. 3 is a flow diagram of method 300 for determining cm^(y−1) without using modulo arithmetic and for using cm^(y−1) to determine cm^y (mod N), according to some embodiments. Method 300 may be performed by processing logic that may comprise hardware (e.g., circuitry, dedicated logic, programmable logic, microcode, etc.), software (such as instructions run on a processing device), firmware or a combination thereof. In one embodiment, method 300 is performed by a cryptographic message (cm) exponential module 103 in a microprocessor 100 of FIG. 1. In another embodiment, the method 300 is performed by the cryptographic message exponential module 200 as shown in FIG. 2.

At block 301, the microprocessor or logic determines which word [j] for cm^2 to compute. The number of words for cm^2 may be 2 log N/log W. The microprocessor or logic can include a loop counter register j and may read the loop counter register j to determine which word [j] for cm^2 to compute. For example, the loop counter register j may be initialized to zero. In another example, the value of j may be incremented or decremented with an iteration of a loop in the cryptographic message exponential module 200. For example, j=3.

At block 303, the microprocessor or logic determines the word [j] of cm^2 using the words of the cryptographic message and an intermediate accumulator (e.g., intermediate accumulator 218 in FIG. 2). The microprocessor or logic can use the intermediate accumulator to accumulate the products of words [k] and words [l] of the cryptographic message, where k+l=j. For example, the word [j] of cm^2 may be determined as:

$$cm^2[j] = \Sigma_{k+l=j} cm[k] \times cm[l] \qquad \text{Equation 1}$$

The summation of Equation 1 may be modified to include a carry term from lower bits of cm [j] to determine the word [j] exactly and increase efficiency by a factor of two.

At block 305, the microprocessor or logic updates the word of the output accumulator register (e.g., output accumulator register 235 in FIG. 2) using the cryptographic message and the word [j] for cm^2. For example, the microprocessor or logic can perform an operand scan on the cryptographic message with the finalized word [j] of cm^2. The microprocessor or logic can use the word [j] of cm^2 as a multiplicand, and the word [i] of the cryptographic message as a multiplier into multiplier circuitry (e.g., multiplier circuitry 225 in FIG. 2) of an output accumulator. In one implementation, the microprocessor or logic uses a temporary accumulator register of the output accumulator.

At block 307, the microprocessor or logic writes the result back into the output accumulator register. The microprocessor or logic may write the result in a word corresponding to i+j, or use a rotating register. At block 309, the microprocessor or logic reduces the content of the output accumulator register modulo N. In one implementation, in RSA, the modulus N is part of a public key. In one implementation, the number of bits of the modulus N is fixed to reduce register/memory usage. The microprocessor or logic can use Montgomery reduction, Barrett reduction, or some other form of reduction to reduce the output accumulator register modulo N. For example, the microprocessor or logic can use modulo N multiplication, such as, and not limited to, Montgomery multiplication, Barrett multiplication, etc. In one implementation, the computation uses a Montgomery correction factor. The reduction may be coarsely or finely integrated with the operand scanning (CIOS or FIOS mode). In one implementation, the microprocessor or logic does not compute cm^3 (mod N), but instead computes (cm^3/2^92) (mod N), when Montgomery reduction is used.

At block 311, the microprocessor or logic determines whether there is another word [j] of cm^2 to determine. If there is another word [j] of cm^2 to be determined, the microprocessor or logic increments j at block 313 and returns to block 301 to determine which word [j] for cm^2 to compute. Method 300 or portions of method 300 can be iterative. The number of iterations can be based on the number of words [j] in cm^2. For example, the number of words [i] in cm^2 may be 2 log N/log W.

If there is not another word [j] of cm^2 to be determined (block 311), the current content in the output accumulator register is cm^3 (mod N), which can be used, for example, and not limited in RSA key exchange, RSA encryption, signatures, etc. In one implementation, the compute time for determining the third power of the cryptographic message using module arithmetic is proportional to the square of the size of the cryptographic message. For example, method 300 may take quadratic time to determine cm^3 (mod N).

Figure 4:
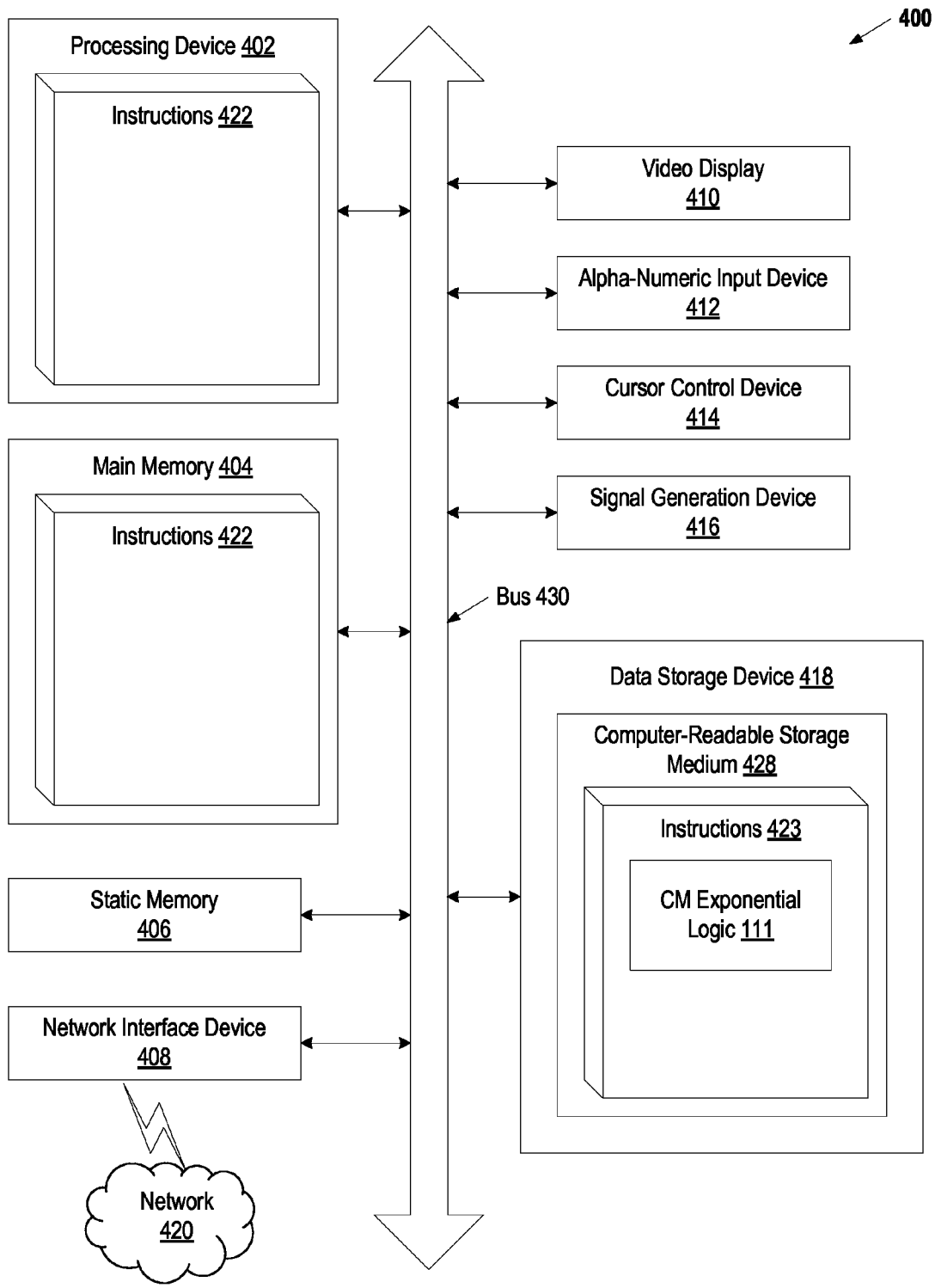
FIG. 4 is a block diagram of an example computer system that may perform one or more of the operations of a cryptographic message exponential module described herein, in accordance with various implementations.

FIG. 4 illustrates a diagram of a machine in an example form of a computer system 400 within which a set of instructions, for causing the machine to perform any one or more of the methodologies of a cryptographic message exponential logic (e.g., CM exponential logic 111 in FIG. 1) discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines, chips (or components of chips), and/or microprocessors that individually or jointly execute a set (or multiple sets) of instructions to perform any one or more of the methodologies discussed herein.

The example computer system 400 includes a processing device (processor) 402, a main memory 404 (e.g., read-only memory (ROM), flash memory, dynamic random access memory (DRAM) such as synchronous DRAM (SDRAM), double data rate (DDR SDRAM), or DRAM (RDRAM), etc.), a static memory 406 (e.g., flash memory, static random access memory (SRAM), etc.), and a data storage device 418, which communicate with each other via a bus 430.

Processor 402 represents one or more general-purpose processing devices such as a microprocessor, central processing unit, or the like. More particularly, the processor 702 may be a complex instruction set computing (CISC) microprocessor, reduced instruction set computing (RISC) microprocessor (including without limitation an embedded CPU core running the ARM or MIPS instruction set), very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 422 for performing operations and steps discussed herein. The instructions 422 may also reside, completely or at least partially, within the main memory 404 and/or within the processor 402 during execution thereof by the computer system 400, the main memory 404 and the processor 402 also constituting computer-readable storage media. The instructions 422 may further be transmitted or received over a network 420 via the network interface device 408. Instructions 422 (or other instructions associated with the present invention) may be digitally signed (or otherwise cryptographically authenticated), and verified prior to execution (e.g. by processor 402).

The computer system 400 may further include a network interface device 408. The computer system 400 also may include a video display unit 410 (e.g., a liquid crystal display (LCD) or a cathode ray tube (CRT)), an input device 412 (e.g., a keypad, a touchscreen, an alphanumeric keyboard, a motion sensing input device, etc.), a cursor control device 414 (e.g., a mouse), and/or a signal generation device 416 (e.g., a speaker).

The data storage device 418 may include a computer-readable storage medium 428 on which is stored one or more sets of instructions 423 (e.g., software) embodying any one or more of the methodologies or functions of a cryptographic message exponential module described herein. While the computer-readable storage medium 428 (machine-readable storage medium) is shown in an exemplary implementation to be a single medium, the term "computer-readable storage medium" should be taken to include a single medium or multiple media (e.g., RAID array, network-attached storage device, flash memories, a centralized or distributed database, and/or associated caches and servers, etc.) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "determining", "storing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

The following examples pertain to further embodiments.

Example 1 is an apparatus for providing modular exponentiation optimization for cryptographic systems comprising 1) a first register to store a plurality of components of cryptographic message; and 2) a microprocessor coupled to the first register to determine a plurality of components for a second power of the cryptographic message using the plurality of components of the cryptographic message, wherein the determining of the plurality of components for the second power of the cryptographic message is performed without storing an actual second power of the cryptographic message and determine a third power of the cryptographic message using modular arithmetic, the plurality of components for the second power of the cryptographic message, and the plurality of components of the cryptographic message, wherein the plurality of components for the second power of the cryptographic message are determined without using modular arithmetic.

In Example 2, to determine the third power of the cryptographic message using modular arithmetic in the subject matter of Example 1 can optionally comprise the microprocessor to determine a third power of the cryptographic message mod N using modulo N multiplication, wherein N is a modulus.

In Example 3, the modulo N multiplication in the subject matter of Example 2 can optionally comprise Montgomery multiplication.

In Example 4, the modulo N multiplication in the subject matter of Example 2 can optionally comprise Barrett multiplication.

In Example 5, the modulus N in the subject matter of Example 2 can optionally be part of a public key in RSA.

In Example 6, the subject matter of Example 2 can optionally comprise a number of bits of the modulus N being fixed.

In Example 7, the subject matter of Example 2 can optionally further comprise a second register to store the third power of the cryptographic message mod N, wherein a size of the first register and a size of the second register correspond to a size of the cryptographic message.

In Example 8, the compute time to determine the third power of the cryptographic message using modular arithmetic the subject matter of Example 1 can optionally be proportional to a square of a size of the cryptographic message.

Various embodiments may have different combinations of the operational features described above. For instance, all optional features of the apparatus described above may also be implemented with respect to the method or process described herein and specifics in the examples may be used anywhere in one or more embodiments.

Example 9 is a method for providing modular exponentiation optimization for cryptographic systems comprising 1) identifying, by a microprocessor, a cryptographic message stored in a first register; 2) determining a plurality of components for a second power of the cryptographic message using a plurality of components of the cryptographic message, wherein the determining of the plurality of components for the second power of the cryptographic message is performed without storing an actual second power of the cryptographic message; and 3) determining a third power of the cryptographic message using modular arithmetic, the plurality of components for the second power of the cryptographic message, and the plurality of components of the cryptographic message, wherein the plurality of components for the second power of the cryptographic message are determined without using modular arithmetic.

In Example 10, the determining of the third power of the cryptographic message using modular arithmetic in the subject matter of Example 9 can optionally comprise determining a third power of the cryptographic message mod N using modulo N multiplication, wherein N is a modulus.

In Example 11, the modulo N multiplication in the subject matter of Example 10 can optionally comprise Montgomery multiplication.

In Example 12, the modulo N multiplication in the subject matter of Example 10 can optionally comprise Barrett multiplication.

In Example 13, the modulus N in the subject matter of Example 10 can optionally be part of a public key in RSA.

In Example 14, the subject matter of Example 10 can optionally comprise a number of bits of the modulus N being fixed.

In Example 15, the subject matter of Example 10 can optionally further comprise a second register to store the third power of the cryptographic message mod N, wherein a size of the first register and a size of the second register correspond to a size of the cryptographic message.

In Example 16, the compute time to determine the third power of the cryptographic message using modular arithmetic the subject matter of Example 9 can optionally be proportional to a square of a size of the cryptographic message.

Various embodiments may have different combinations of the operational features described above. For instance, all optional features of the method described above may also be implemented with respect to a non-transitory, computer-readable storage medium. Specifics in the examples may be used anywhere in one or more embodiments.

Examples 17-24 are a non-transitory, computer-readable storage medium including instructions that, when executed by a computing system, cause the computing system to perform the operations of Examples 9-16.

Various embodiments may have different combinations of the operational features described above. For instance, all optional features of the method described above may also be implemented with respect to an apparatus. Specifics in the examples may be used anywhere in one or more embodiments.

Examples 25-32 are a system for protecting a media item using a media security controller comprising means for executing the operations of Examples 9-16.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

What is claimed is:

1. A method comprising:
identifying, by logic on an integrated circuit, a cryptographic message stored in a first register; determining a plurality of components for a second power of the cryptographic message using a plurality of components of the cryptographic message, wherein the determining of the plurality of components for the second power of the cryptographic message is performed without storing the entire second power of the cryptographic message; and determining a third power of the cryptographic message using modular arithmetic, wherein said determining comprises:
transforming the plurality of components for the second power of the cryptographic message and the plurality of components of the cryptographic message, wherein the plurality of components for the second power of the cryptographic message are determined without using modular arithmetic;
determining the third power of the cryptographic message (mod N) using modulo N multiplication, wherein N is a modulus; wherein the modulo N multiplication comprises at least one of Montgomery multiplication or Barrett multiplication, wherein the modulus N is part of a public key in an RSA cryptosystem, wherein a number of bits of the modulus N are fixed and storing the third power of the cryptographic message (mod N) in a second register, wherein a size of the first register and a size of the second register correspond to a size of the cryptographic message.

2. The method of claim 1, wherein the modulo N multiplication comprises at least one of Montgomery multiplication or Barrett multiplication.

3. The method of claim 1, wherein the modulus N is part of a public key in an RSA cryptosystem.

4. The method of claim 1, wherein a number of bits of the modulus N are fixed.

5. The method of claim 1, wherein a compute time for determining the third power of the cryptographic message using modular arithmetic is proportional to a square of a size of the cryptographic message.

6. An apparatus comprising:
a first register to store a plurality of components of cryptographic message;
a digital logic operatively coupled to the first register, the digital logic to:
determine a plurality of components for a second power of the cryptographic message using the plurality of components of the cryptographic message, wherein the determining of the plurality of components for the second power of the cryptographic message is performed without storing the entire second power of the cryptographic message; and
determine a third power of the cryptographic message using modular arithmetic, including
transforming the plurality of components for the second power of the cryptographic message and the plurality of components of the cryptographic message, wherein the plurality of components for the second power of the cryptographic message are determined without using modular arithmetic, and determining the third power of the cryptographic message (mod N) using modulo N multiplication, wherein N is a modulus; and
a second register to store the third power of the cryptographic message (mod N), wherein a size of the first register and a size of the second register correspond to a size of the cryptographic message.

7. The apparatus of claim 6, wherein the modulo N multiplication comprises at least one of Montgomery multiplication or Barrett multiplication.

8. The apparatus of claim 6, wherein the modulus N is part of a public key in an RSA cryptosystem.

9. The apparatus of claim 6, wherein a number of bits of the modulus N are fixed.

10. The apparatus of claim 6, wherein a compute time to determine the third power of the cryptographic message using modular arithmetic is proportional to a square of a size of the cryptographic message.

11. A non-transitory computer-readable storage medium including instructions that, when executed by a processing device, cause the processing device to perform operations comprising: identifying, the processing device, a cryptographic message stored in a first register; determining a plurality of components for a second power of the cryptographic message using a plurality of components of the cryptographic message, wherein the determining of the plurality of components for the second power of the cryptographic message is performed without storing the entire second power of the cryptographic message; and determining a third power of the cryptographic message using modular arithmetic, wherein said determining comprises: transforming the plurality of components for the second power of the cryptographic message and the plurality of components of the cryptographic message, and wherein the plurality of components for the second power of the cryptographic message are determined without using modular arithmetic; wherein determining the third power of the cryptographic message using modular arithmetic comprises: determining a third power of the cryptographic message (mod N) using modulo N multiplication, wherein N is a modulus, wherein the modulo N multiplication comprises at least one of Montgomery multiplication or Barrett multiplication, wherein the modulus N is part of a public key in an RSA cryptosystem and storing the third power of the cryptographic message (mod N) in a second register, wherein a size of the first register and a size of the second register correspond to a size of the cryptographic message.

12. The non-transitory computer-readable storage medium of claim 11, wherein the modulo N multiplication comprises at least one of Montgomery multiplication or Barrett multiplication.

13. The non-transitory computer-readable storage medium of claim 11, wherein the modulus N is part of a public key in an RSA cryptosystem.

14. The non-transitory computer-readable storage medium of claim 11, wherein a compute time for determining the third power of the cryptographic message using modular arithmetic is proportional to a square of a size of the cryptographic message.

* * * * *